United States Patent
Nam

(10) Patent No.: US 11,442,929 B2
(45) Date of Patent: Sep. 13, 2022

(54) DOUBLE HEADER LOGGING OF SLOTTED PAGE STRUCTURES

(71) Applicant: RESEARCH & BUSINESS FOUNDATION SUNGKYUNKWAN UNIVERSITY, Suwon-si (KR)

(72) Inventor: Beom Seok Nam, Seoul (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 215 days.

(21) Appl. No.: 16/729,539

(22) Filed: Dec. 30, 2019

(65) Prior Publication Data
US 2020/0210409 A1    Jul. 2, 2020

(30) Foreign Application Priority Data
Dec. 31, 2018    (KR) .................... 10-2018-0174053

(51) Int. Cl.
*G06F 16/23*    (2019.01)
(52) U.S. Cl.
CPC ...... *G06F 16/2379* (2019.01); *G06F 16/2365* (2019.01)
(58) Field of Classification Search
None
See application file for complete search history.

(56) References Cited

U.S. PATENT DOCUMENTS

| | | | |
|---|---|---|---|
| 2003/0061537 A1* | 3/2003 | Cha ..................... | G06F 11/2094 714/16 |
| 2014/0112339 A1 | 4/2014 | Safranek et al. | |
| 2014/0279930 A1 | 9/2014 | Gupta et al. | |
| 2015/0261564 A1 | 9/2015 | Busaba et al. | |

FOREIGN PATENT DOCUMENTS

| | | |
|---|---|---|
| KR | 10-1221992 B1 | 1/2013 |
| KR | 10-2016-0088432 A | 7/2016 |
| KR | 10-2016-0145197 A | 12/2016 |
| KR | 10-2018-0021923 A | 3/2018 |
| KR | 10-2018-0082753 A | 7/2018 |

OTHER PUBLICATIONS

Seo, Jihye, et al., "Failure-Atomic Slotted Paging for Persistent Memory", ACM ASPLOS '17, (Apr. 2017), pp. 91-104 (Year: 2017).*
Goel, Aakash, et al., "Fast Database Restarts at Facebook", ACM SIGMOD 2014, pp. 541-549. (Year: 2014).*
(Continued)

*Primary Examiner* — Scott A. Waldron
(74) *Attorney, Agent, or Firm* — NSIP Law

(57) ABSTRACT

Provided are a doubleheader logging methods of a slotted page and a database apparatuses. The method of double-header logging of a slotted page performed by a database apparatus includes determining a valid slot header among a first slot header and a second slot header of a page to select a slot header; selecting a valid slot header according to the determination result; and performing a transaction based on the selected valid slot header.

20 Claims, 10 Drawing Sheets

(56) References Cited

OTHER PUBLICATIONS

Lee, Wongun, et al., "WALDIO: Eliminating the Filesystem Journaling in Resolving the Journaling of Journal Anomaly", Proceedings of the 2015 USENIX Annual Technical Conference, pp. 235-247. (Year: 2015).*

Oh, Sehyeon, et al., "Doubleheader Logging: Eliminating Journal Write Overhead for Mobile DBMS", 2020 IEEE 36th International Conference on Data Engineering, pp. 1237-1248. (Year: 2020).*

Korean Office Action dated Mar. 30, 2020 in corresponding Korean Patent Application No. 10-2018-0174053 (6 pages in Korean).

Notice of Allowance dated Sep. 22, 2020 in counterpart Korean Patent Application No. 10-2018-0174053 (5 pages in Korean).

* cited by examiner

DOUBLE HEADER LOGGING OF SLOTTED PAGE STRUCTURES

CROSS-REFERENCE TO RELATED APPLICATIONS

This application claims priority to Korean Patent Application No. 10-2018-0174053 filed on 31 Dec. 2018 in Korea, the entire contents of which are hereby incorporated by reference in their entirety.

BACKGROUND

1. Technical Field

The present disclosure relates to a doubleheader logging methods of a slotted page and a database apparatuses.

2. Description of Related Art

Because a database should have a structure that can efficiently store a large amount of data in a hard disk, many databases, such as Oracle, MySQL, and SQLite, use a slotted paged structure as a page format.

Further, because the database has the limitation that should not lose stored data, in order to keep the stored data intact, the database should have a recovery measure to cope with sudden server down. As a recovery measure, two schemes of Undo and Redo are typically used. However, these schemes do not make use of a slotted page structure of the database.

A conventional slotted page recovery scheme will be described. Recently, databases use one of two logging schemes of Undo and Redo. The Undo logging scheme copies an existing slotted page to a log file as a backup copy before changing the slotted page of a DB file. Thereafter, the Undo logging scheme is a method of directly changing a slotted page of the DB file. That is, twice page writes occur in the Undo logging scheme. The Redo logging scheme first writes a changed page to a log file. Thereafter, the Redo logging scheme is a method of rewriting a changed page in a DB file. In this method, twice page writes occur.

SUMMARY

Exemplary embodiments of the present disclosure provide a doubleheader logging method of a slotted page and a database apparatus that can minimize an input/output amount using a slotted page structure having a doubleheader.

Exemplary embodiments of the present disclosure provide a doubleheader logging method of a slotted page and a database apparatus that can perform page recovery without using a separate log file (e.g., Undo or Redo log file) for page recovery by performing page recovery using two slot headers in which a transaction ID is added to metadata of each slot header in a slotted page structure.

According to one example embodiment of the present disclosure, a method of doubleheader logging of a slotted page performed by a database apparatus includes determining a valid slot header among a first slot header and a second slot header of a page to select a slot header; selecting a valid slot header according to the determination result; and performing a transaction based on the selected valid slot header.

If a transaction ID of the first slot header is less than or equal to a file change counter, the determining of a valid slot header may include determining the first slot header to a valid slot header.

If a transaction ID of the second slot header is less than or equal to a file change counter, the determining of a valid slot header may include determining the second slot header to a valid slot header.

If any one slot header is an invalid slot header in the determination result, the selecting of a valid slot header may include selecting the other slot header as a valid slot header.

If the first slot header and the second slot header are valid slot headers, the selecting of a valid slot header may include selecting a slot header having a larger or equal transaction ID as a valid slot header among the transaction ID of the first slot header and the transaction ID of the second slot header.

If any one slot header is an invalid slot header in the determination result, the method may further include storing data to be added at a free space and storing information about data to be added at the invalid slot header.

Meanwhile, according to another embodiment of the present disclosure, a method of doubleheader logging of a slotted page performed by a database apparatus includes providing a slotted page to select a slot header; and performing a transaction based on a valid slot header among a first slot header and a second slot header of the provided page, wherein the slotted page includes two slot headers, and each slot header includes a transaction ID.

If any one of the first slot header and the second slot header is an invalid slot header, the performing of a transaction may include selecting the other slot header as a valid slot header.

If the first slot header and the second slot header are valid slot headers, the performing of a transaction may include selecting a slot header having a larger or equal transaction ID as a valid slot header among a transaction ID of the first slot header and a transaction ID of the second slot header.

The method may further include storing data to be added in a free space and storing information about data to be added in a slot header determined to an invalid slot header.

Meanwhile, according to another embodiment of the present disclosure, a method of doubleheader logging of a slotted page performed by a database apparatus includes determining an invalid slot header among a first slot header and a second slot header of a page to be recovered; invalidating the invalid slot header according to the determination result; and performing a transaction based on a valid slot header that is not invalidated according to the determination result.

If a transaction ID of the first slot header exceeds a file change counter, the determining of an invalid slot header may include determining the first slot header as an invalid slot header.

If a transaction ID of the second slot header exceeds a file change counter, the determining of an invalid slot header may include determining the second slot header as an invalid slot header.

The method may further include determining whether a page to be recovered is a last page and moving, if a page to be recovered is not a last page, to the next page.

Meanwhile, according to another embodiment of the present disclosure, a database apparatus for doubleheader logging of a slotted page includes a database for storing a database file configured with pages; a memory for storing at least one instruction; and a processor connected to the database and the memory, wherein the processor executes the at least one instruction to determine a valid slot header among a first slot header and a second slot header of a page to select a slot header, to select a valid slot header according to the determination result, and to perform a transaction based on the selected valid slot header.

If a transaction ID of the first slot header is less than or equal to a file change counter, the processor may determine the first slot header to a valid slot header.

If a transaction ID of the second slot header is less than or equal to a file change counter, the processor may determine the second slot header to a valid slot header.

If any one slot header is an invalid slot header in the determination result, the processor may select the other slot header as a valid slot header.

If the first slot header and the second slot header are valid slot headers, the processor may select a slot header having a larger or equal transaction ID as a valid slot header among a transaction ID of the first slot header and a transaction ID of the second slot header.

If any one slot header is an invalid slot header in the determination result, the processor may store data to be added in a free space of the database and storing information about data to be added at an invalid slot header.

Meanwhile, according to another embodiment of the present disclosure, a database apparatus for doubleheader logging of a slotted page includes a database for storing a database file configured with pages; a memory for storing at least one instruction; and a processor connected to the database and the memory, wherein the processor executes the at least one instruction to determine an invalid slot header among a first slot header and a second slot header of a page to be recovered, to invalidate an invalid slot header according to the determination result, and to perform a transaction based on a valid slot header that is not invalidated according to the determination result.

If a transaction ID of the first slot header exceeds a file change counter, the processor may determine the first slot header to an invalid slot header.

If a transaction ID of the second slot header exceeds a file change counter, the processor may determine the second slot header to an invalid slot header.

The processor may determine whether the page to be recovered is the last page and move to the next page, if the page to be recovered is not the last page.

Meanwhile, according to another embodiment of the present disclosure, there is provided a computer readable storage medium including processor executable instructions, wherein the instructions, when executed by the processor, enable the processor to determine a valid slot header among a first slot header and a second slot header of a page to select a slot header, to select a valid slot header according to the determination result, and to perform a transaction based on the selected valid slot header.

Meanwhile, according to another embodiment of the present disclosure, there is provided a computer readable storage medium including processor executable instructions, wherein the instructions, when executed by the processor, enable the processor to determine an invalid slot header among a first slot header and a second slot header of a page to be recovered, to invalidate the invalid slot header according to the determination result, and to perform a transaction based on a valid slot header that is not invalidated according to the determination result.

According to exemplary embodiments of the present disclosure, by using a slotted page structure having a doubleheader, an input/output amount can be minimized.

According to exemplary embodiments of the present disclosure, by performing page recovery using two slot headers in which a transaction ID is added to metadata of each slot header in a slotted page structure, page recovery can be performed without using a separate log file (e.g., Undo or Redo log file) for page recovery.

DETAILED DESCRIPTION OF EXAMPLE EMBODIMENTS

Figure 1:
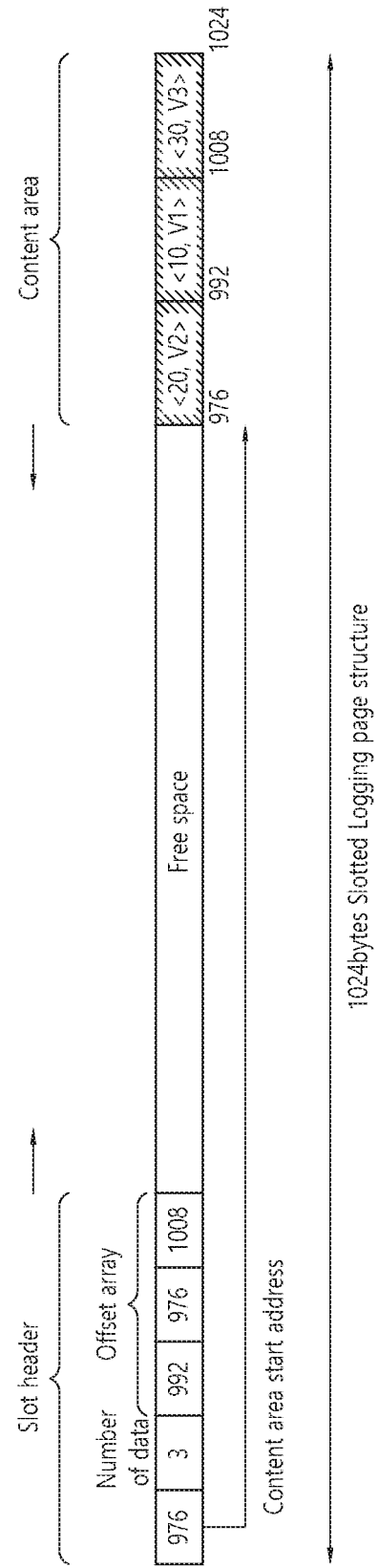
FIG. 1 is a diagram illustrating a general slotted page structure.

The present disclosure may be variously changed, have several embodiments, and illustrates specific embodiments in the drawings and describes in detail.

However, the present disclosure is not limited to specific embodiments, and it should be understood that the present disclosure includes all changes, equivalents, and substitutes included in the spirit and scope thereof.

A term such as first and second may be used for describing various constituent elements, but the constituent elements are not limited by the terms. The terms are used for distinguishing one constituent element from another constituent element. For example, a first constituent element may be referred to as a second constituent element without deviating from the scope of the present disclosure and similarly, a second constituent element may be referred to as a first constituent element. A term "and/or" includes a combination of a plurality of related described elements or any element of a plurality of related described elements.

When it is described that a constituent element is "connected" or "electrically connected" to another constituent element, the element may be "directly connected" or "directly electrically connected" to the other constituent elements or may be "connected" or "electrically connected" to the other constituent elements through a third element. However, when it is described that a constituent element is "directly connected" or "directly electrically connected" to another constituent element, no element may exist between the element and the other constituent elements.

Terms used in the present application are used for describing a specific exemplary embodiment and do not limit the present disclosure. Unless the context otherwise clearly indicates, words used in the singular include the plural, the plural includes the singular. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

Unless differently defined, entire terms used here including a technical or scientific term have the same meaning as a meaning that may be generally understood by a person of common skill in the art. It should be analyzed that terms defined in a generally using dictionary have a meaning corresponding with that of a context of related technology and are not analyzed as an ideal or excessively formal meaning unless explicitly defined.

Hereinafter, a preferred embodiment of the present disclosure will be described in detail with reference to the accompanying drawings. In describing the present disclosure, in order to facilitate the overall understanding, the same reference numerals are used for the same elements in the drawings, and redundant description of the same elements is omitted.

FIG. 1 is a diagram illustrating a general slotted page structure.

FIG. 1 illustrates a slotted page structure having a size of 1024 bytes. For example, the slotted page may have any size, such as 1 KB, 4 KB, or 8 KB. The slotted page is divided into a slot header for storing metadata of a page, a free space, and a contents area for storing data. The slot header stores a content area start address, which is a boundary between the content area and the free space. Further, the slot header stores the number of data stored in the content area and stores a start address of each data in an offset array.

The offset array is an array that stores a position of data in the page, and as data is added, a size thereof increases. The added data is stored at a boundary with a content area at the back of the free space, and thus the content area increases in size in front of the page. That is, when new data <40, V4> is stored in FIG. 1, the new data <40, V4> is positioned at a 960th position of the page, and thus the content area is increased to the left, and the offset array is increased to the right to become an array having four elements. In this case, a start address of the content area should also be updated to 960, and the number of data should also be increased to 4.

Figure 2:
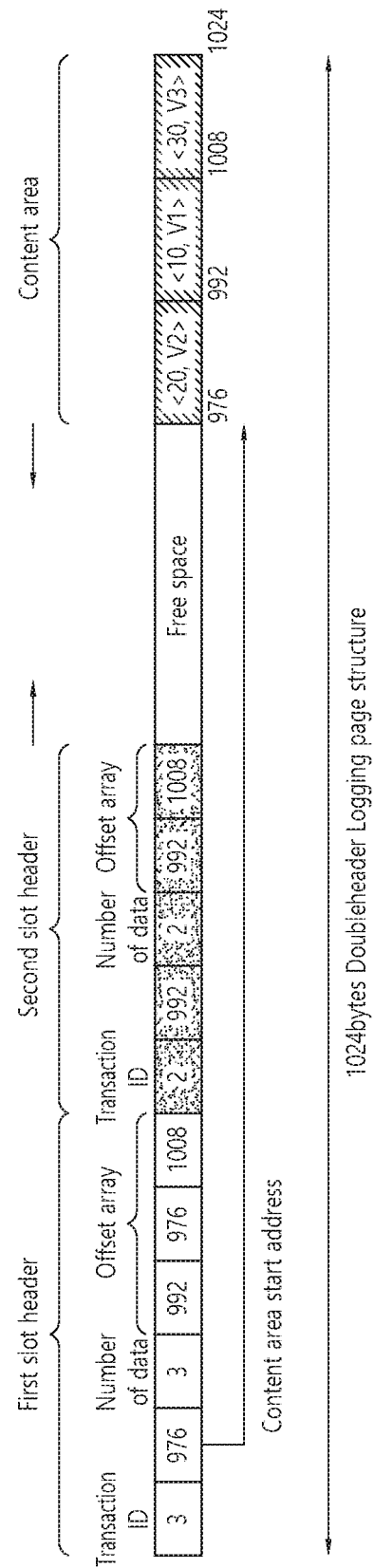
FIG. 2 is a diagram illustrating a page structure for doubleheader logging according to an embodiment of the present disclosure.

FIG. 2 is a diagram illustrating a page structure of doubleheader logging according to an embodiment of the present disclosure.

A page structure for doubleheader logging according to an embodiment of the present disclosure will be described. Doubleheader logging according to an embodiment of the present disclosure does not use a separate Undo or Redo log file. Alternatively, as illustrated in FIG. 2, doubleheader logging uses two slot headers in a slotted page structure. That is, doubleheader logging alternately stores metadata about a content area in a first slot header and a second slot header.

Unlike a general slotted page structure illustrated in FIG. 1, a page structure of doubleheader logging has a first slot header and a second slot header, which are two slot headers. A transaction ID is added to metadata of each slot header. The reason why one slot header is added is that only one slot header of two slot headers is a valid slot header, and the other slot header serves as a log.

Figure 3A:
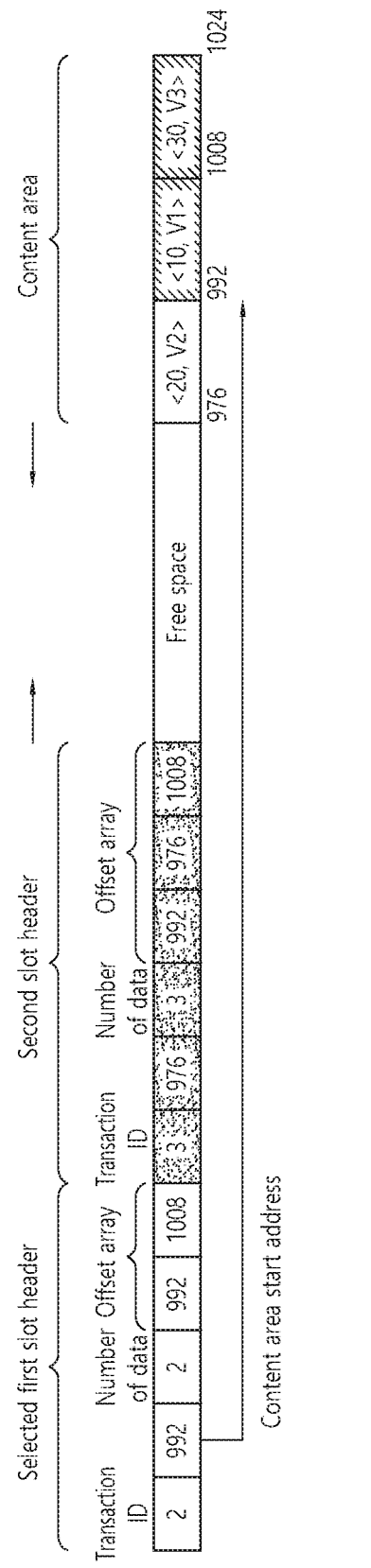
FIGS. 3A and 3B are diagrams illustrating operation algorithm of a doubleheader logging method according to an embodiment of the present disclosure.
Figure 3B:
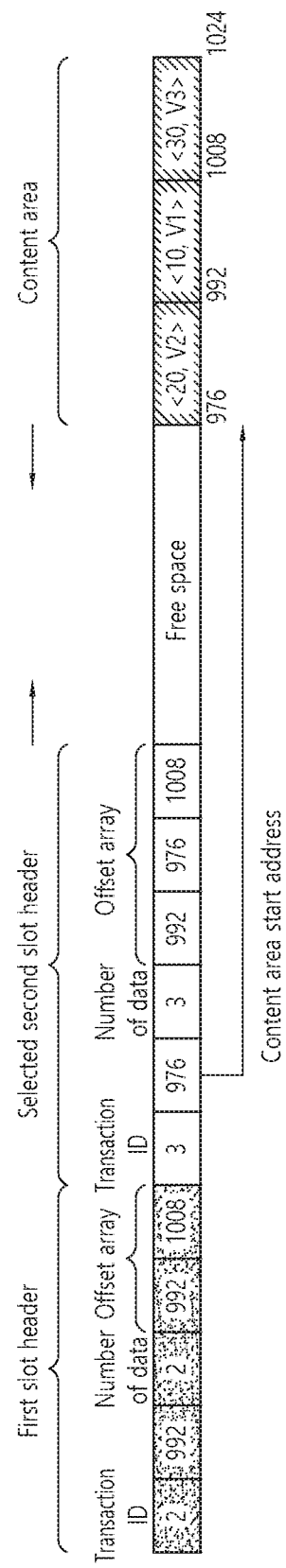

FIGS. 3A and 3B are diagrams illustrating operation algorithm of a doubleheader logging method according to an embodiment of the present disclosure.

Doubleheader logging leaves existing metadata and an offset array in one slot header (e.g., first slot header) when adding data to a page and writes modified metadata and an offset array in another slot header (e.g., second slot header).

That is, because doubleheader logging does not modify a current valid slot header, it is possible to check a page before data is added through the valid slot header.

The doubleheader logging method stores new data in a free space when writing new data. The doubleheader logging method stores an offset array including a position of new data and data information including the number of data in an invalid slot header to update the slot header. When update of the slot header is completed, the transaction ID number of the slot header updated further than the existing valid slot header becomes higher. For this reason, a new slot header becomes the latest slot header. The existing valid slot header becomes the old slot header. When the transaction ID of the database is increased, the existing valid slot header is changed to an invalid slot header, and a slot header updated further than the existing valid slot header becomes a valid slot header.

Here, the latest slot header may not always be a valid slot header. When each write transaction is ended, a transaction ID thereof is stored in a position of the database header. If the transaction ID of the slot header is larger than the transaction ID, the slot header is invalid. The valid slot header is a slot header having the latest transaction ID among slot headers having a transaction ID less than or equal to the transaction ID of the entire database.

As illustrated in FIGS. 3A and 3B, both cases are the same slotted page. However, if the transaction ID of an entire database 140 is 2, as illustrated in FIG. 3A, the first slot header becomes a valid slot header, and only two data of V1 and V3 may be viewed. As illustrated in FIG. 3B, if the transaction ID of the entire database 140 is 3, the second slot header becomes a valid slot header and all of V1, V2, and V3 may be viewed.

A case will be described in which the slotted page should be restored to a previous state by rollback of a transaction 3. In this case, by returning a valid page to the first slot header, it is possible to return to a page in which only two data of V1 and V3 are stored. Therefore, in the doubleheader logging method according to an embodiment of the present disclosure, it is not necessary to separately write a backup. That is, the doubleheader logging method according to an embodiment of the present disclosure has both a backup and a revised copy in one page. Therefore, the doubleheader logging method according to an embodiment of the present disclosure does not need to write once more in a hard disk, as in a conventional Undo or Redo logging scheme and may show an excellent performance.

Figure 4:
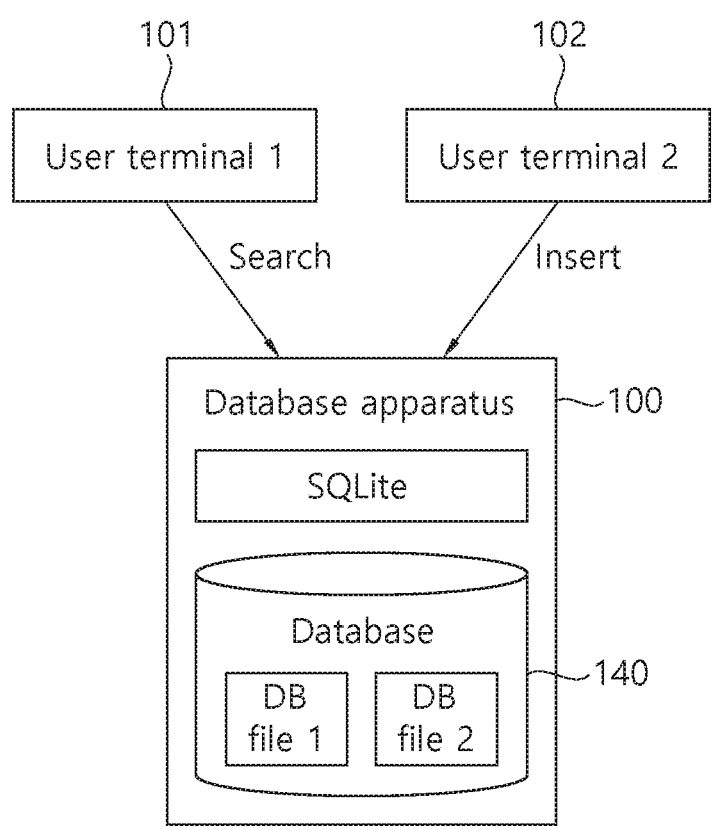
FIGS. 4 and 5 are diagrams illustrating a block configuration of a database apparatus according to an embodiment of the present disclosure.
Figure 5:
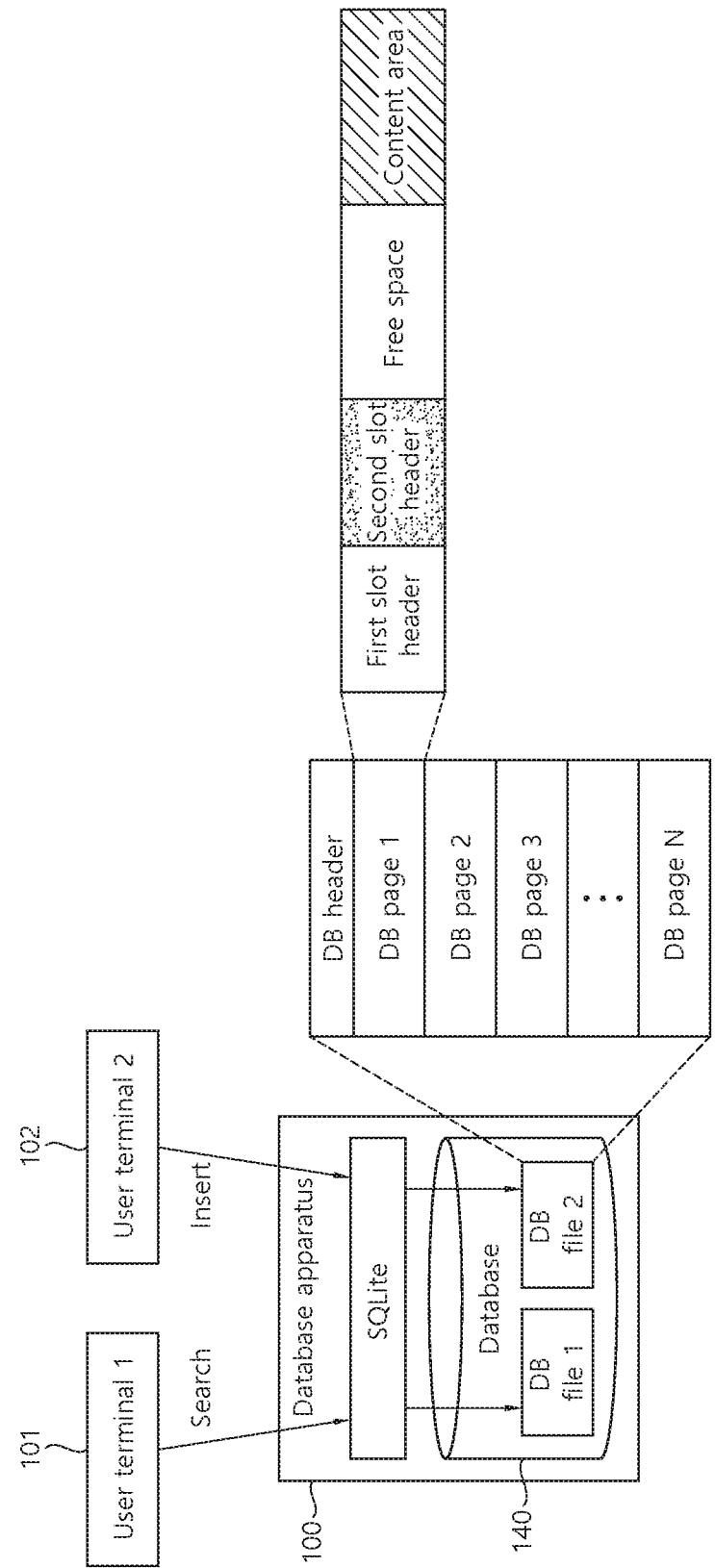

FIGS. 4 and 5 are diagrams illustrating a block configuration of a database apparatus 100 according to an embodiment of the present disclosure.

As illustrated in FIG. 4, a database apparatus 100 includes a database 140 in which a plurality of DB files are stored. User terminals 101 and 102 may enable to search for a DB file stored in the database apparatus 100 or to insert new data. A user terminal 1, 101 may request a search by the database apparatus 100. Further, a user terminal 2, 102 may request data insertion by the database apparatus 100.

As illustrated in FIG. 5, the database apparatus 100 may search for a DB file through SQLite or insert new data into the DB file according to a search request or an insertion request of a user terminal. For example, when the user terminal 1, 101 requests a search for a DB file 1 to the database apparatus 100, the database apparatus 100 searches for the DB file 1 stored in the database 140 through SQLite. When the user terminal 2, 102 requests to insert new data into the DB file 2 to the database apparatus 100, the database apparatus 100 may insert new data into the DB file 2 stored in the database 140 through SQLite.

The DB file is configured with a DB header and a plurality of DB pages 1 to N. Each of the plurality of DB pages includes a first slot header, a second slot header, a free space, and a content area. Here, any one of the first slot header and the second slot header may correspond to a current transaction of the database 140 and may be a valid slot header. The other slot header corresponds to a previous transaction of the database 140 and serves as a log for the previous transaction, and may be a slot header that is not currently valid.

Figure 6:
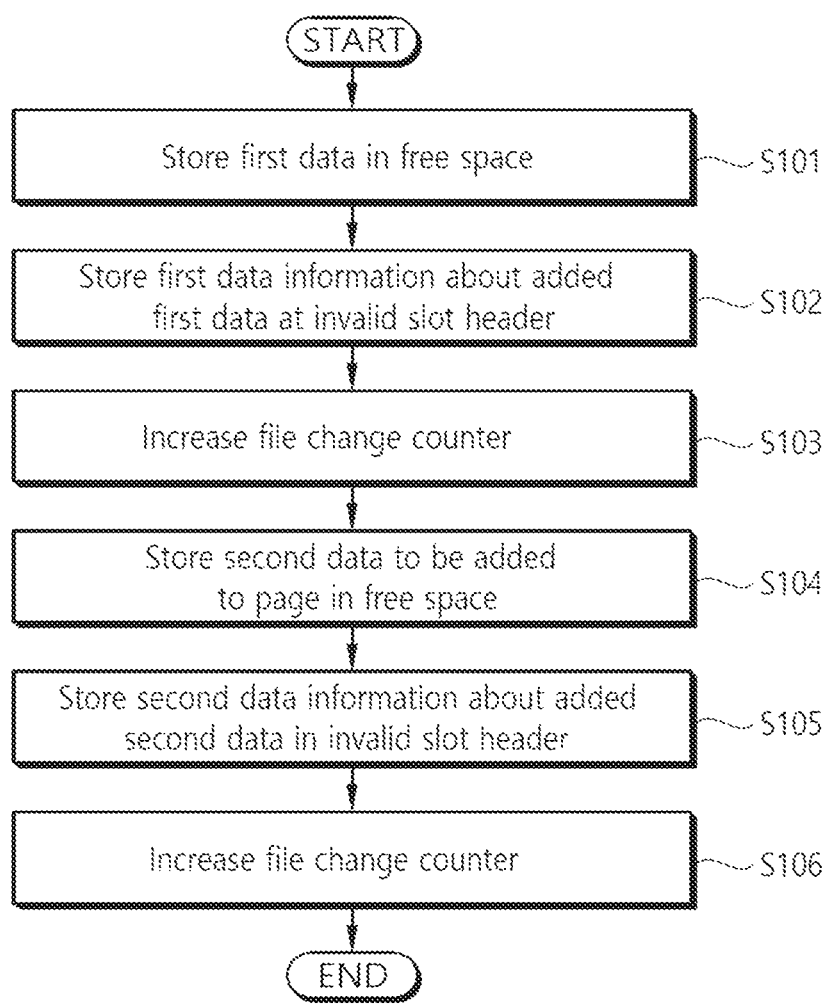
FIG. 6 is a flowchart illustrating a method of storing data of a slotted page according to one embodiment of the present disclosure.

FIG. 6 is a flowchart illustrating a data storage method of a slotted page according to one embodiment of the present disclosure.

FIG. 6 illustrates an operation of sequentially storing first data and second data in a free space.

In step S101, the database apparatus 100 stores the first data to be added to a page in the free space.

In step S102, the database apparatus 100 determines a valid slot header and an invalid slot header among a first slot header and a second slot header and stores first data information about the added first data at an invalid slot header. For example, if the first slot header is not valid, the database apparatus 100 stores the first data information about the first data in the first slot header.

Thereafter, in step S103, the database apparatus 100 increases a file change counter. Here, while converting an invalid slot header to a valid slot header, the increased file change counter makes the valid slot header into the invalid slot header.

Thereafter, a case will be described in which another transaction stores the second data.

In step S104, the database apparatus 100 stores the second data to be added to the page in the free space.

In step S105, the database apparatus 100 stores second data information about the second data at an invalid slot header. For example, because the slot header in which the first data information is stored is the first slot header, the second slot header becomes an invalid slot header. Therefore, the database apparatus 100 stores second data information about new second data in the invalid second slot header instead of the first slot header. In this case, the database apparatus 100 overwrites the data information previously stored in the second slot header with the second data information.

In step S106, the database apparatus 100 increases the file change counter.

In this way, the slot header is changed once for each transaction and the file change counter is increased.

Figure 7:
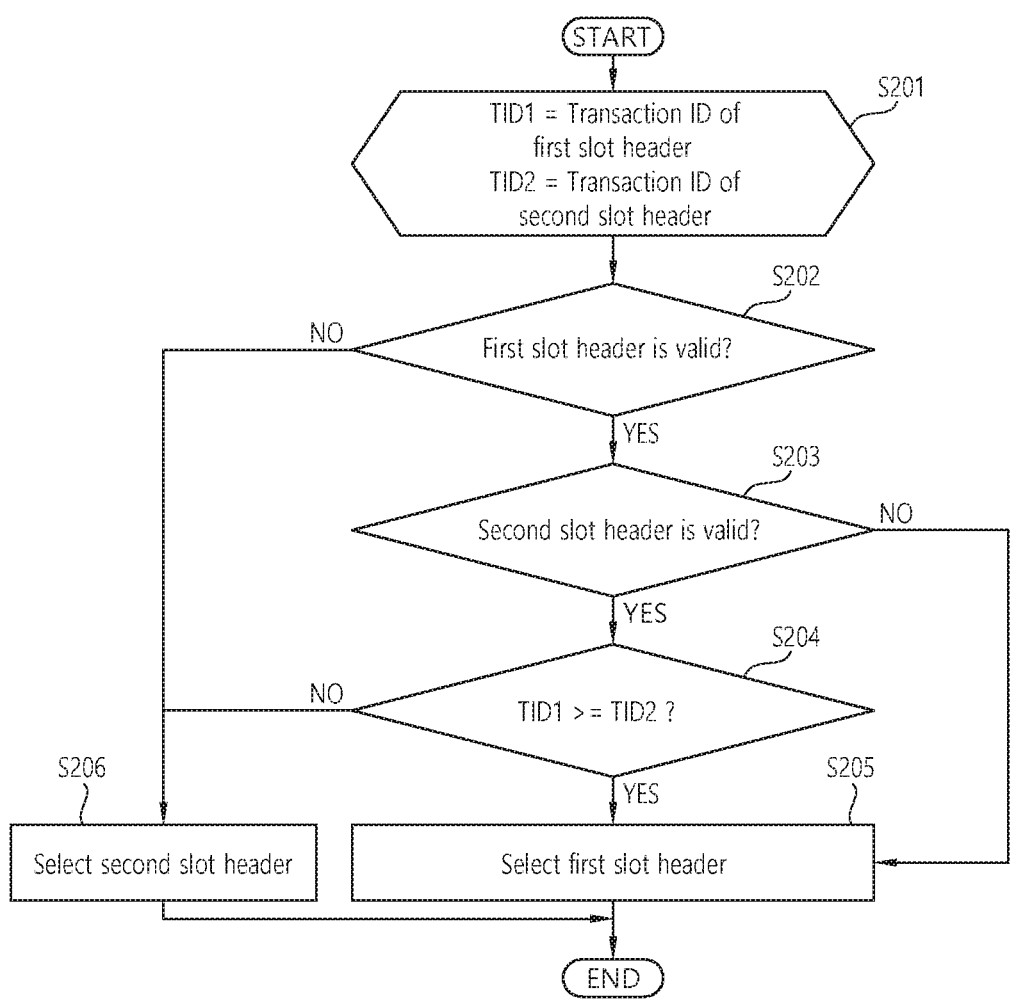
FIG. 7 is a flowchart illustrating a slot header selection method in a doubleheader logging method of a slotted page according to an embodiment of the present disclosure.

FIG. 7 is a flowchart illustrating a slot header selection method in a doubleheader logging method of a slotted page according to an embodiment of the present disclosure.

In the doubleheader logging method, one page has two slot headers, which are a first slot header and a second slot header. Therefore, the doubleheader logging method should select an appropriate, i.e., valid slot header. For this reason, the doubleheader logging method may select a valid slot header by performing algorithm such as the flowchart illustrated in FIG. 7.

In step S201, the database apparatus 100 obtains a transaction ID of a first slot header and a transaction ID of a second slot header, and designates the transaction ID of the first slot header and the transaction ID of the second slot header to TID1 and TID2, respectively.

In step S202, the database apparatus 100 determines whether the first slot header is valid.

In step S203, if the first slot header is valid, the database apparatus 100 determines whether the second slot header is valid.

In step S204, if the second slot header is valid, the database apparatus 100 determines whether the transaction ID TID1 of the first slot header is larger than or equal to the transaction ID TID2 of the second slot header.

In operation S205, if the transaction ID TID1 of the first slot header is equal to or larger than the transaction ID TID2 of the second slot header, the database apparatus 100 selects the first slot header.

In operation S206, if the transaction ID TID1 of the first slot header is less than the transaction ID TID2 of the second slot header, the database apparatus 100 selects the second slot header.

Figure 8:
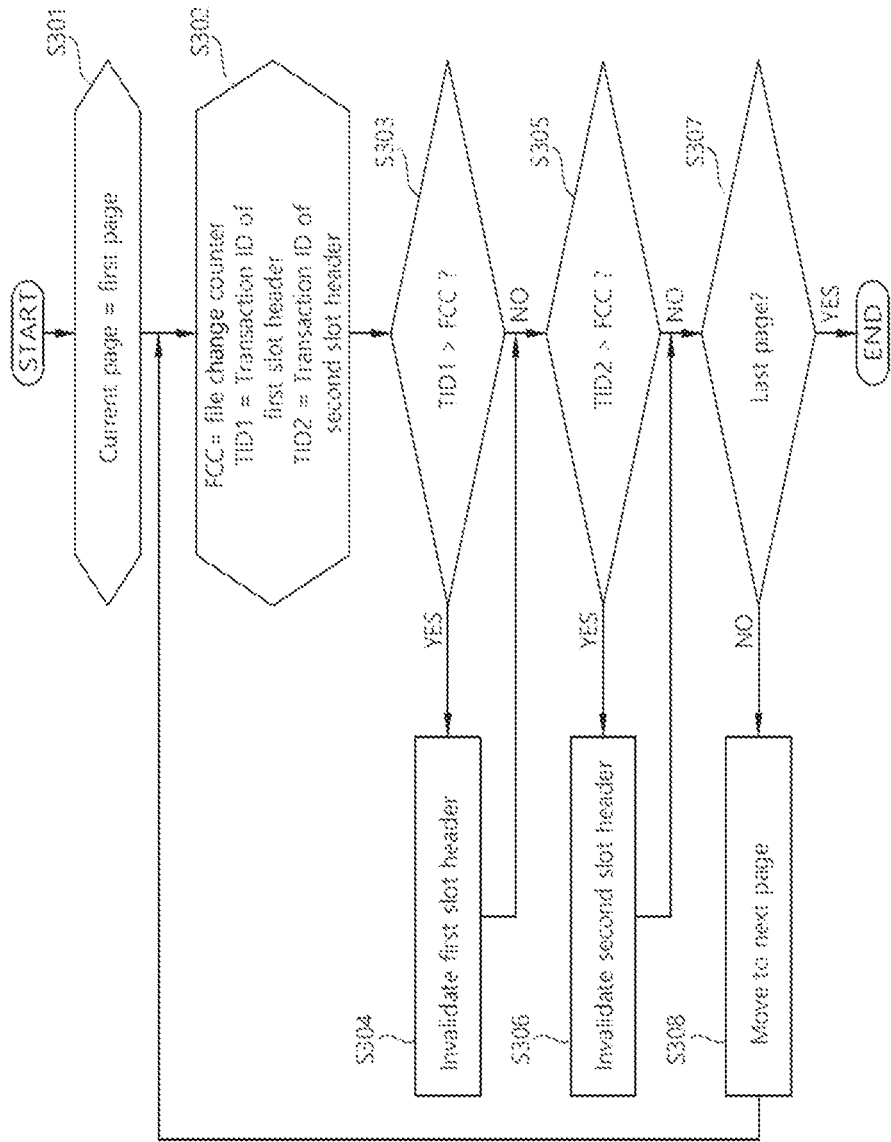
FIG. 8 is a flowchart illustrating a method of recovering a slotted page in a doubleheader logging method of a slotted page according to an embodiment of the present disclosure.

FIG. 8 is a flowchart illustrating a method of recovering a slotted page in a doubleheader logging method of a slotted page according to an embodiment of the present disclosure.

When the slotted page should be recovered, the database apparatus 100 according to an embodiment of the present disclosure performs algorithm for determining whether which slot header of two slot headers should be a valid slot header. The flowchart of FIG. 8 shows this algorithm. If a transaction ID of the slot header is larger than an entire transaction ID of the database 140, it means that a server is down before the transaction is terminated, thereby invalidating the corresponding slot header. This method has the same effect as if the transaction does not proceed by making the data inaccessible without deleting invalid data. When this operation is performed for all pages of the file, all the changes due to the transaction are not visible and thus the work becomes the same work as that returned to the previous database 140 and thus the next transaction may be proceeded. Hereinafter, a recovery method of the slotted page will be described in detail.

In step S301, the database apparatus 100 designates a current page as the first page.

In step S302, the database apparatus 100 obtains a file change counter, a transaction ID of a first slot header, and a transaction ID of a second slot header, and the file change counter, the transaction ID of the first slot header, and the transaction ID of the second slot header are designated to FCC, TID1, and TID2, respectively.

In step S303, the database apparatus 100 determines whether a transaction ID TID1 of the first slot header exceeds a file change counter (FCC).

In step S304, if a transaction ID TID1 of the first slot header exceeds a file change counter FCC, the database apparatus 100 invalidates the first slot header.

In operation S305, if a transaction ID TID1 of the first slot header does not exceed a file change counter FCC, the database apparatus 100 determines whether a transaction ID TID2 of the second slot header exceeds the file change counter FCC.

In step S306, if a transaction ID TID2 of the second slot header exceeds the file change counter FCC, the database apparatus 100 invalidates the second slot header.

In operation S307, if a transaction ID TID2 of the second slot header does not exceed the file change counter FCC, the database apparatus 100 determines whether the current page is a last page.

In step S308, if the current page is not a last page, the database apparatus 100 moves to the next page.

Figure 9:
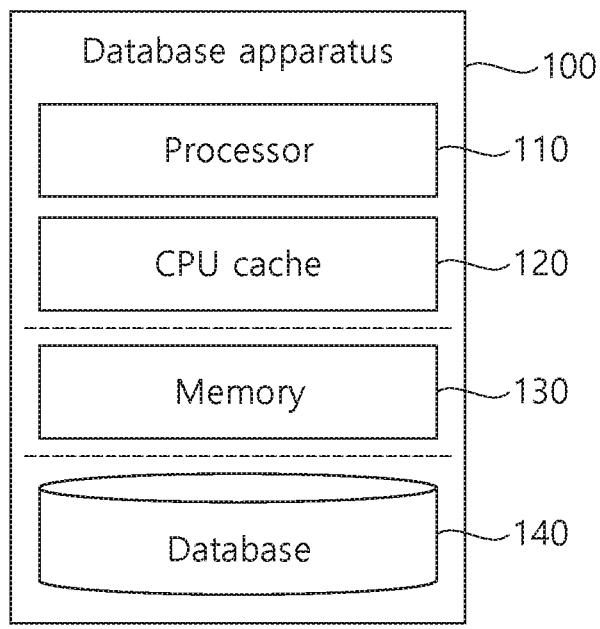
FIG. 9 is a block diagram illustrating a database apparatus for doubleheader logging of a slotted page according to an embodiment of the present disclosure.

FIG. 9 is a block diagram illustrating a database apparatus 100 for doubleheader logging of a slotted page according to an embodiment of the present disclosure.

As illustrated in FIG. 9, a database apparatus 100 for doubleheader logging of a slotted page according to an embodiment of the present disclosure may include a processor 110, a CPU cache 120, a memory 130, and a database 140. However, all illustrated components are not essential components. The database may be implemented by more components than the illustrated component, or may be implemented by fewer components than the illustrated component.

First, a specific configuration and operation of each component of the database apparatus 100 for selecting a slot header of a slotted page according to an embodiment of the present disclosure will be described.

The database 140 stores at least one database 140 file configured with pages.

The CPU cache 120 stores data of positions most frequently used in the memory 130. The processor 110 directly accesses the memory 130 and copies transmitted data to the CPU cache 120 and thus when the processor 110 accesses the same address at the next time, the processor 110 enable to read and write data at the CPU cache 120.

The memory 130 stores at least one instruction.

The processor 110 is connected to the CPU cache 120, the memory 130, and the database 140. By executing at least one instruction, the processor 110 determines a valid slot header among a first slot header and a second slot header of a page to select a slot header, selects a valid slot header according to the determination result, and performs a transaction based on the selected valid slot header.

According to various embodiments, if the transaction ID of the first slot header is less than or equal to the file change counter, the processor 110 may determine the first slot header as a valid slot header.

According to various embodiments, if the transaction ID of the second slot header is less than or equal to the file change counter, the processor 110 may determine the second slot header as a valid slot header.

According to various embodiments, if any one slot header is an invalid slot header in the determination result, the processor 110 may select the other slot header as a valid slot header.

According to various embodiments, if the first slot header and the second slot header are valid slot headers, the processor 110 may select a slot header having a larger or equal transaction ID as a valid slot header among the transaction ID of the first slot header and the transaction ID of the second slot header.

According to various embodiments, if any one slot header is an invalid slot header in the determination result, the processor 110 may store data to be added in a free space of the database 140 and store information about data to be added at the invalid slot header.

A specific configuration and operation of each component of the database apparatus 100 for selecting a slot header of a slotted page according to another embodiment of the present disclosure will be described.

By executing at least one instruction, the processor 110 provides a slotted page to select a slot header and performs a transaction based on a valid slot header among the first slot header and the second slot header of the provided page. The slotted page may include two slot headers, and each slot header may include a transaction ID.

A specific configuration and operation of each component of the database apparatus 100 for recovering a slotted page according to another embodiment of the present disclosure will be described.

The database 140 stores a database 140 file configured with pages.

The memory 130 stores at least one instruction.

The processor 110 is connected to the database 140 and the memory 130. By executing the at least one instruction, the processor 110 determines an invalid slot header among a first slot header and a second slot header of a page to be recovered, invalidates the invalid slot header according to the determination result, and performs a transaction based on the valid slot header without being invalidated according to the determination result.

According to various embodiments, if the transaction ID of the first slot header exceeds the file change counter, the processor 110 may determine the first slot header to an invalid slot header.

According to various embodiments, if the transaction ID of the second slot header exceeds the file change counter, the processor 110 may determine the second slot header to an invalid slot header.

According to various embodiments, the processor 110 may determine whether the page to be recovered is a last page, and move to the next page, if the page to be recovered is not a last page.

The above-described doubleheader logging method of a slotted page according to embodiments of the present disclosure may be embodied into computer readable codes on a computer readable recording medium. A doubleheader logging method of a slotted page according to embodiments of the present disclosure may be implemented in the form of program commands that may be executed by various computer means to be recorded in a computer readable recording medium.

A computer readable storage medium including processor executable instructions may be provided, wherein the instructions, when executed by the processor, enable the processor to determine an invalid slot header among a first slot header and a second slot header of a page to be recovered, to invalidate the invalid slot header according to the determination result, and perform a transaction based on the valid slot header without being invalidated according to the determination result.

A computer readable recording medium includes all kinds of record mediums that store data that may be read by a computer system. For example, the computer readable recording medium may include a read only memory (ROM), a random access memory (RAM), a magnetic tape, a magnetic disk, a flash memory, an optical data storage device, or the like. Further, the computer readable recording medium may be distributed in computer systems connected by a computer communication network to be stored and executed as a readable code in a distributed fashion.

Specifically, the described features may be implemented within a digital electronic circuit, computer hardware, firmware, or combinations thereof. The features may be executed in a computer program product implemented in a storage in a machine readable storage device, for example, for execution by a programmable processor. The features may be performed by a programmable processor executing a program of instructions for performing functions of the described embodiments by operating on input data and generating an output. The described features may be executed in one or more computer programs that may be executed on a programmable system including at least one programmable processor, at least one input device, and at least one output device coupled so as to receive data and directives from a data storage system, and to transmit data and directives to a data storage system. The computer program includes a set of directives that may be used directly or indirectly within a computer so as to perform a particular action on a given result. A computer program is written in any form of programming language including compiled or interpreted languages, and may be used in any form included as a module, element, subroutine, or other unit suitable for use in another computer environment, or an independent operation program.

Appropriate processors for execution of a program of directives include, for example, both general purpose and special purpose microprocessors, and one of a single processor or multiple processors of another kind of computer. Further, storage devices appropriate for implementing computer program instructions and data for implementing the described features include, for example, all forms of semiconductor memory devices such as erasable programmable read only memory (EPROM), electrically erasable and programmable read only memory (EEPROM), and flash memory devices, magnetic devices such as internal hard disks and removable disks, and non-volatile memories including magneto-optical disks and compact disc read-only memory (CD-ROM) and digital versatile disc read-only memory (DVD-ROM) disks. The processor and the memory may be integrated in application-specific integrated circuits (ASICs) or added by ASICs.

Although the present disclosure described above has been described based on a series of functional blocks, the present disclosure is not limited to the above-described embodiments and the accompanying drawings, and it will be apparent to one of ordinary skill in the art that various substitutions, modifications, and changes are possible without departing from the technical spirit of the present disclosure.

Combinations of the above-described embodiments are not limited to the above-described embodiments, and various types of combinations as well as the above-described embodiments may be provided according to implementation and/or need.

In the above embodiments, although the methods have been described on the basis of flowcharts using a series of steps or blocks, the present disclosure is not limited to the sequence of the steps, and some steps may occur in different order or concurrently with the other steps described above. Further, those skilled in the art will understand that steps shown in the flowcharts are not exclusive and may include other steps or one or more steps of the flowcharts may be deleted without affecting the scope of the present disclosure.

The foregoing embodiments include examples of various aspects. Although all possible combinations for representing various aspects may not be described, one of ordinary skill in the art will recognize that other combinations are possible. Accordingly, the present disclosure includes all other replacements, modifications, and variations that fall within the scope of the following claims.

What is claimed is:

1. A processor-implemented method of doubleheader logging of a slotted page performed by a database apparatus comprising a processor, a memory, and a database, the page includes a first slot header and a second slot header for storing metadata of the page, a free space, and a content area for storing data, the method comprising:
   determining, by the processor, whether the first slot header of the page or the second slot header of the page is valid by comparing a transaction ID of each of the first slot header and the second slot header with a file change counter;
   selecting, by the processor, one of the first and second slot headers determined to be valid as a valid slot header;
   performing, by the processor, a transaction based on the selected valid slot header.

2. The processor-implemented method of claim 1, wherein the determining comprises determining the first slot header to be valid in response to the transaction ID of the first slot header being less than or equal to the file change counter.

3. The processor-implemented method of claim 1, wherein the determining comprises determining the second slot header to be valid in response to the transaction ID of the second slot header being less than or equal to the file change counter.

4. The processor-implemented method of claim 1, wherein the selecting comprises selecting, in response to one of the first and second slot headers being determined to be invalid, the other slot header as the valid slot header.

5. The processor-implemented method of claim 1, wherein the selecting comprises selecting, in response to both of the first slot header and the second slot header being determined to be valid, one of the first slot header and the second slot header that has a larger transaction ID as the valid slot header.

6. The processor-implemented method of claim 1, further comprising storing, in response to one of the first slot header and the second slot header being determined to be invalid, data to be added at a free space and storing data information of data to be added at the invalid slot header.

7. A processor-implemented method of double header logging of a slotted page performed by a database apparatus comprising a processor, a memory, and a database, the page includes a first slot header and a second slot header for storing metadata of the page, a free space, and a content area for storing data, the method comprising:
   providing, by using the processor, the slotted page comprising the first slot header and the second slot header to determine whether the first slot header is valid or the second slot header is valid and select one of the first slot header and the second slot header determined to be valid as a valid slot header; and
   performing, by the processor, a transaction based on the selected valid slot header of the provided page,
   wherein each of the first and second slot headers comprises a transaction ID, and the transaction ID of each slot header is compared with a file change counter to determine whether the first slot header or the second slot header is valid.

8. The processor-implemented method of claim 7, wherein the performing comprises selecting, in response to one of the first slot header and the second slot header being determined to be invalid, the other slot header as the valid slot header.

9. The processor-implemented method of claim 7, wherein the performing comprises selecting, in response to the first slot header and the second slot header being determined to be valid, one of the first slot header and the second slot header that has a larger transaction ID as the valid slot header.

10. The processor-implemented method of claim 7, further comprising storing data to be added in a free space and storing information about data to be added in one of the first and second slot headers determined to be invalid.

11. A processor-implemented method of doubleheader logging of a slotted page performed by a database apparatus comprising a processor, a memory and a database, the page includes a first slot header and a second slot header for storing metadata of the page, a free space, and a content area for storing data, the method comprising:

determining, by using the processor, whether the first slot header of the page to be recovered or the second slot header of the page to be recovered is valid by comparing a transaction ID of each of the first slot header and the second slot header with a file change counter;

invalidating, by the processor, one of the first slot header and the second slot header determined to be invalid; and performing, by the processor, a transaction based on one of the first slot header and the second slot header determined to be valid.

12. The processor-implemented method of claim 11, wherein the determining comprises determining the first slot header to be invalid in response to the transaction ID of the first slot header exceeding the file change counter.

13. The processor-implemented method of claim 11, wherein the determining the determining comprises determining the second slot header to be invalid in response to the transaction ID of the second slot header exceeding the file change counter.

14. The processor-implemented method of claim 11, further comprising determining, by using the processor, whether a page to be recovered is a last page, and moving the database apparatus to a next page when the page to be recovered is not the last page.

15. A database apparatus for doubleheader logging of a slotted page, the database apparatus comprising:

a database for storing a database file configured with a database header and a plurality of database pages;

a memory for storing at least one instruction; and a processor connected to the database and the memory, wherein the processor executes the at least one instruction to:

determine whether a first slot header of a page or a second slot header of the page is valid by comparing a transaction ID of the first slot header and a transaction ID of the second slot header with a file change counter;

select one of the first and second slot headers determined to be valid as a valid slot header; and perform a transaction based on the selected valid slot header.

16. The database apparatus of claim 15, wherein the processor determines the first slot header to be valid in response to the transaction ID of the first slot header being less than or equal to the file change counter.

17. The database apparatus of claim 15, wherein the processor determines the second slot header to be valid in response to the transaction ID of the second slot header being less than or equal to the file change counter.

18. The database apparatus of claim 15, wherein the processor selects, in response to one of the first and second slot headers being determined to be invalid, the other slot header as the valid slot header.

19. The database apparatus of claim 15, wherein the processor selects, in response to both of the first and second slot headers being determined to be valid, one of the first and second slot headers that has a larger transaction ID as the valid slot header.

20. A database apparatus for doubleheader logging of a slotted page, the page includes a first slot header and a second slot header for storing metadata of the page, a free space, and a content area for storing data, the database apparatus comprising:

a database for storing a database file configured with a database header and a plurality of database pages;

a memory for storing at least one instruction; and a processor connected to the database and the memory, wherein the processor executes the at least one instruction to configure the processor to:

obtain a file change counter for a page of the database file;

determine whether the first slot header of the page to be recovered or the second slot header of the page to be recovered is valid by comparing a transaction ID of the first slot header and a transaction ID of the second slot header with a file change counter;

invalidate one of the first and second slot headers determined to be invalid; and perform a transaction based on one of the first and second slot headers that is determined to be valid.

* * * * *